UNITED STATES PATENT OFFICE.

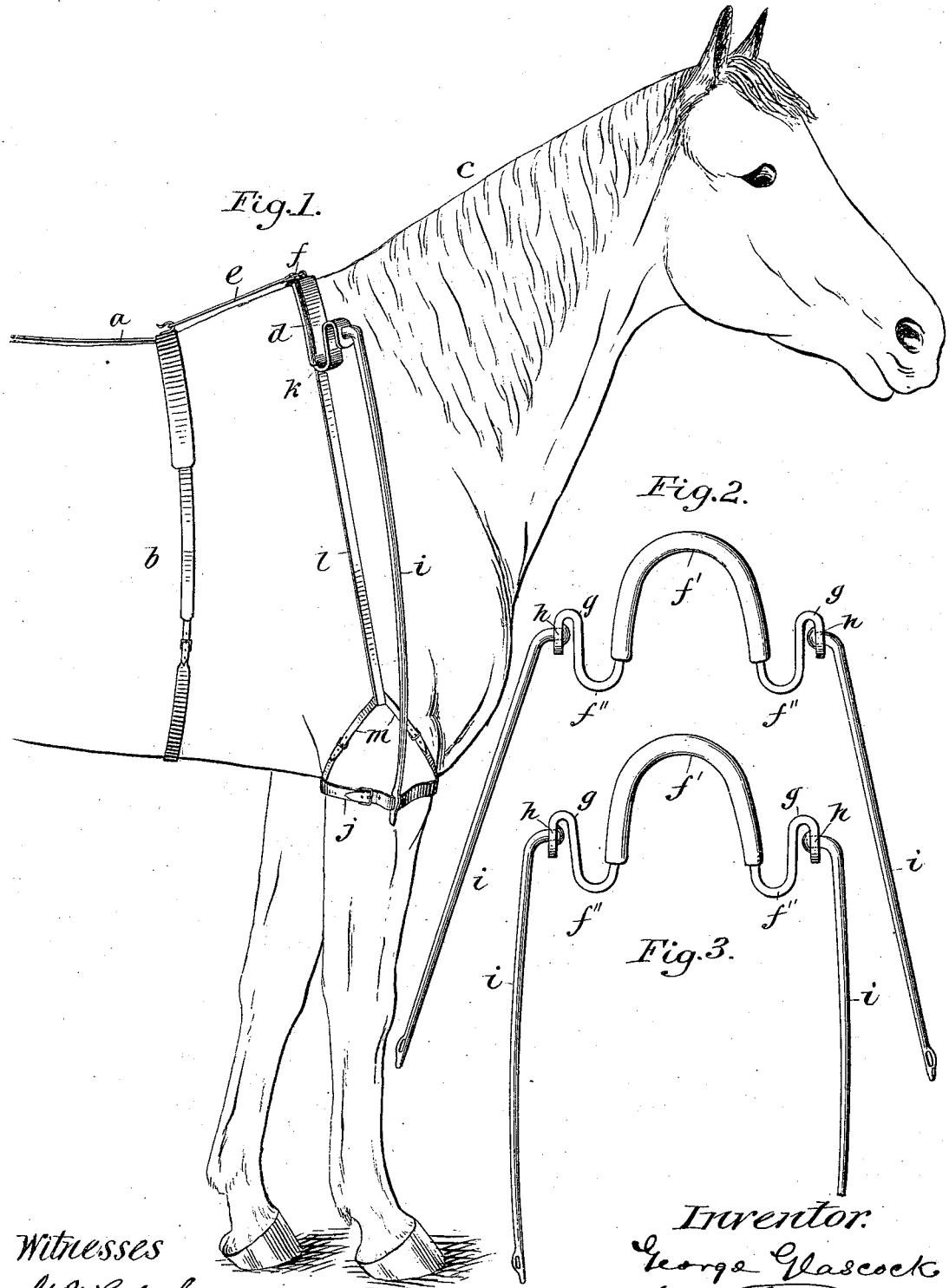

GEORGE GLASCOCK, OF VEEDERSBURG, INDIANA.

FORE-LEG SPREADER FOR HORSES.

SPECIFICATION forming part of Letters Patent No. 510,337, dated December 5, 1893.

Application filed July 10, 1893. Serial No. 480,023. (No model.)

*To all whom it may concern:*

Be it known that I, GEORGE GLASCOCK, a citizen of the United States, residing at Veedersburg, in the county of Fountain and State of Indiana, have invented certain new and useful Improvements in Fore-Leg Spreaders for Horses; and I do hereby declare the following to be a full, clear, and exact description of the invention, such as will enable others skilled in the art to which it appertains to make and use the same.

My invention relates to a fore-leg spreader for horses, and has as its object the doing away with knee-boots and other contrivances to prevent knee-knocking.

It consists in a saddle-piece which fits over the withers of the animal, and at its ends is provided with spring rods or strips having loops at their extremities, to pass around the fore-legs.

It consists also in suspenders secured to the saddle and supporting the loops.

It consists also in certain features of construction and combinations of parts to be hereinafter described and then pointed out in the claims.

In order that my invention may be fully understood, I will now proceed to describe the same with reference to the accompanying drawings, in which—

Figure 1 is a view representing a horse, showing the device in position. Fig. 2 is a front elevation of the device, showing the springs in normal position, and Fig. 3 is a similar view showing the position of the springs when in use, as in Fig. 1.

In the drawing $a$ indicates the harness, of which $b$ is the belly-band, and $c$ is a horse to which my improved fore-leg spreader is applied.

$d$ is a saddle-piece preferably of metal, covered with leather. This saddle-piece fits over the withers of the animal, and is connected by a stay-strap $e$, to the belly-band $b$. The strap $e$ passes through a ring $f$ on the saddle-piece. The saddle-piece is approximately of W shape, the central part $f'$ being curved or U shaped to fit the withers, and the ends $f^2, f^2$, being inclined or curved outwardly so as to bring the hook-shaped extremities $g, g$, in practice about four inches from the withers. Through the hooked extremities $g, g$, holes $h, h$, pass, and these holes receive the inner ends of spring rods or strips $i, i$, which swivel in them. In their normal position these springs extend or stand out from the ends of the saddle-piece, as shown in Fig. 2. These spring rods or strips, $i, i$, taper toward their outer ends, and at said ends they are provided with straps $j, j$, which form separable loops that are buckled around the fore-legs close up to the body of the animal.

When the device is in use, the spring rods or strips $i, i$, are bent inwardly toward the body of the animal, see Fig. 3, and their tendency is to spread the fore legs. The manner of connecting the spring-rods or strips to the saddle-piece forms hinge-joints.

To properly support the loops or strips $j, j$, I attach to the saddle-piece at the points $k, k$, suspender-cords or the like $l, l$, which at their lower ends are provided with a pair of supporters $m, m$, that may be connected with the loops in any preferred manner.

It is evident that slight changes in this device may be resorted to by skilled mechanics without departing from the scope and spirit of my invention, and I do not, therefore, limit myself to the precise construction shown.

What I claim is—

1. A fore leg spreader comprising a saddle piece adapted to rest upon the withers of the animal, a spring rod attached to either side of said saddle piece, and the opposite ends of said rods attached to loops or straps passing around the front legs of the animal, substantially as described.

2. A fore leg spreader comprising the saddle piece having the lower portion extended upward and the terminals bent downward, the spring rods attached thereto and having eyes for attachment of the leg straps at their lower ends.

3. The fore leg spreader described comprising the saddle piece $f'$, having the bent terminals $g$, the spring rods $i$, attached thereto and provided with eyes at their lower ends, the leg straps $j$, and supporting straps $l$ and $m$, substantially as described.

In testimony whereof I affix my signature in presence of two witnesses.

GEORGE GLASCOCK.

Witnesses:
JOSEPH G. GLASCOCK,
R. A. BONE.